US011926878B2

(12) United States Patent
Hoffman

(10) Patent No.: US 11,926,878 B2
(45) Date of Patent: Mar. 12, 2024

(54) LEATHER BURNISHING TOOL

(71) Applicant: Christopher Hoffman, Bayonne, NJ (US)

(72) Inventor: Christopher Hoffman, Bayonne, NJ (US)

( * ) Notice: Subject to any disclaimer, the term of this patent is extended or adjusted under 35 U.S.C. 154(b) by 0 days.

(21) Appl. No.: 17/495,388

(22) Filed: Oct. 6, 2021

(65) Prior Publication Data

US 2022/0106650 A1 Apr. 7, 2022

Related U.S. Application Data

(60) Provisional application No. 63/088,241, filed on Oct. 6, 2020.

(51) Int. Cl.
*C14B 11/00* (2006.01)
*C14B 19/00* (2006.01)

(52) U.S. Cl.
CPC .............. *C14B 11/00* (2013.01); *C14B 19/00* (2013.01)

(58) Field of Classification Search
CPC ............. C14B 11/00; C14B 19/00; B68F 3/04
See application file for complete search history.

(56) References Cited

U.S. PATENT DOCUMENTS 95,779 A * 10/1869 Cummingham .......... C14B 1/00 69/21
286,128 A * 10/1883 Gordon .................. A43D 95/20 12/77
289,646 A 12/1883 Dunklee
377,574 A 2/1888 Patch
443,679 A * 12/1890 James ....................... C14B 1/00 69/1
446,923 A 2/1891 Miller
544,399 A * 8/1895 Arnold ...................... C14B 1/00 69/8
761,696 A 6/1904 McCarter
797,551 A 8/1905 Brett
1,144,170 A * 6/1915 Chandler ............... A43D 95/20 12/78
1,175,596 A 3/1916 Buck
1,181,758 A 5/1916 Glass
1,192,389 A 7/1916 Chandler
(Continued)

FOREIGN PATENT DOCUMENTS

BE 497759 A1 12/1950
CA 443797 A 8/1947
(Continued)

OTHER PUBLICATIONS

Citian, Jul. 19, 2019 (Year: 2019).*

*Primary Examiner* — Bao-Thieu L Nguyen
(74) *Attorney, Agent, or Firm* — Gearhart Law, LLC

(57) ABSTRACT

A leather burnishing tool is described. The tool comprises a first end disposed opposite a second end and a body portion disposed between the first end and the second end. The first end includes a first channel and a top portion. The second end comprises a second polished channel configured to accept an edge of a piece of leather therein and a bottom portion configured to be flush with a horizontal surface. The tool is continuously slid along the edge of the piece of leather to shape the edge of the piece of leather. In examples, the leather burnishing tool is configured to engage a tool holder.

17 Claims, 10 Drawing Sheets

(56) References Cited

U.S. PATENT DOCUMENTS

| | | | | | |
|---|---|---|---|---|---|
| 1,208,552 | A | | 12/1916 | Harriman et al. | |
| 1,253,650 | A | * | 1/1918 | Guelpen | C14B 11/00 69/7.7 |
| 1,280,710 | A | * | 10/1918 | Glass | C14B 11/00 69/7.7 |
| 1,339,776 | A | | 5/1920 | Merrick | |
| 1,365,389 | A | * | 1/1921 | Feige | C14B 11/00 69/7.7 |
| 1,423,051 | A | * | 7/1922 | Van Guelpen | C14B 11/00 69/7.7 |
| 1,423,052 | A | * | 7/1922 | Van Guelpen | A43D 95/20 69/7.7 |
| 1,569,854 | A | | 1/1926 | Doerr | |
| 1,621,515 | A | * | 3/1927 | Merrick | C14B 11/00 12/1 R |
| 1,734,365 | A | * | 11/1929 | Collins | C14B 9/00 69/17 |
| 1,743,183 | A | * | 1/1930 | Barclay | A43D 95/22 492/26 |
| 1,829,492 | A | * | 10/1931 | Rettman | C14B 11/00 69/17 |
| 2,177,785 | A | * | 10/1939 | Pestel | H03K 4/12 156/254 |
| 2,432,401 | A | * | 12/1947 | Etem | B05C 7/08 118/DIG. 10 |
| 2,440,113 | A | * | 4/1948 | Noecker | C14B 11/00 493/449 |
| 2,571,149 | A | | 10/1951 | Maciejakowski et al. | |
| 4,132,190 | A | * | 1/1979 | Stahl | B05C 7/00 118/76 |
| 4,993,243 | A | * | 2/1991 | Guinn | B23Q 11/06 69/37 |
| 2022/0106650 | A1 | * | 4/2022 | Hoffman | C14B 19/00 |

FOREIGN PATENT DOCUMENTS

| | | | |
|---|---|---|---|
| GB | 190724433 | A | 10/1908 |
| GB | 190822526 | A | 8/1909 |
| GB | 191505951 | A | 9/1916 |
| GB | 104207 | A | 2/1917 |
| GB | 101150 | A | 8/1917 |
| GB | 118152 | A | 8/1918 |
| GB | 172107 | A | 11/1921 |
| GB | 156571 | A | 1/1922 |
| GB | 173513 | A | 2/1922 |
| GB | 206586 | A | 11/1923 |
| GB | 261458 | A | 11/1926 |
| GB | 293812 | A | 7/1928 |
| GB | 395515 | A | 7/1933 |
| GB | 412230 | A | 6/1934 |
| GB | 412599 | A | 7/1934 |
| GB | 452433 | A | 8/1936 |
| GB | 663986 | A | 1/1951 |
| GB | 672151 | A | 5/1952 |
| GB | 704142 | A | 2/1954 |

* cited by examiner

LEATHER BURNISHING TOOL

CROSS-REFERENCE TO RELATED APPLICATIONS

This application is a non-provisional application which claims priority to provisional application 63/088,241 filed Oct. 6, 2020, the contents of which is hereby fully incorporated by reference in its entirety.

FIELD OF THE EMBODIMENTS

The field of the invention and its embodiments relate to leather burnishing tools. In particular, the present invention describes a leather burnishing tool that can be slid along a flat plane or horizontal surface, while maintaining consistent pressure along an edge of a piece of leather to shape and smooth the edge of the piece of leather to a profile of the leather burnishing tool.

BACKGROUND OF THE EMBODIMENTS

When a piece of leather is cut to size or pattern, a raw edge is left that is rough or unfinished in appearance and frequently has a different color than the surface of the material. Various methods may be employed for producing a finished edge to the piece of leather. In some examples, this may occur by skiving the edge of the leather work piece and then turning over or folding the skived edge, such as what is done in the manufacture of boots and shoes. Another method includes shrinking the flesh side of a piece of leather by applying heat and pressure to the end such that the grain surface of the leather curls to such an extent that it will completely hide the raw edge in the finished work. In other examples, burnishing may be used, which is the process of polishing something, such as leather, by rubbing the leather, resulting in a smooth and shiny surface of the leather.

However, what is needed is an improved leather burnishing tool that can be slid along a flat plane or horizontal surface, while maintaining consistent pressure along an edge of a piece of leather to shape and smooth the edge of the piece of leather to a profile of the leather burnishing tool.

EXAMPLES OF RELATED ART

GB 704142 A describes a burnishing tool for finishing the trimmed edges of leather surfaces. U.S. Pat. No. 2,571,149 A describes improvements in or relating to rolling or smoothing devices. U.S. Pat. No. 2,177,785 A describes a method for producing a finished edge for a piece of leather. GB 452433 A describes improvements in or relating to machines for finishing the edges of sheet material, such as leather. GB 663986 A describes a burnishing machine for boots and shoes. U.S. Pat. No. 1,423,052 A describes another leather burnishing tool. CA 443797 A describes a seam-beading process.

Some leather burnishing tools exist in the art. However, their means of operation are substantially different from the present disclosure, as the other inventions fail to solve all the problems taught by the present disclosure.

SUMMARY OF THE EMBODIMENTS

The present invention and its embodiments relate to leather burnishing tools. In particular, the present invention describes a leather burnishing tool that can be slid along a flat plane or horizontal surface, while maintaining consistent pressure along an edge of a piece of leather to shape and smooth the edge of the piece of leather to a profile of the leather burnishing tool.

A first embodiment of the present invention describes a leather burnishing tool. The leather burnishing tool may include a first end disposed opposite a second end. A body portion of the leather burnishing tool is disposed between the first end and the second end. The body portion may be cylindrical, substantially cylindrical, rectangular, or square in shape. However, it should be appreciated that the shape of the body is not limited to the shapes explicitly described herein.

The first end of the leather burnishing tool includes a first channel and a top portion. The top portion of the leather burnishing tool may include a snap button top portion, in examples. The second end of the leather burnishing tool includes a second channel configured to accept an edge of a piece of leather therein and a bottom portion configured to be flush with a horizontal surface or plane.

The second channel of the leather burnishing tool is a polished channel. A size of the second channel is in a range of approximately 1 mm to approximately 6 mm to accommodate thicker cow leather. In preferred examples, the size of the second channel is in the range of approximately 1 mm to approximately 2 mm. In some examples, the second channel of the leather burnishing tool comprises a round shape. In other examples, the second channel of the leather burnishing tool may be any shape. In an illustrative example, the second channel of the leather burnishing tool comprises a hex shape. In other examples, the second channel is flush with the bottom portion. In alternative examples, the second channel comprises a smooth tapered portion such that the second channel is not flush with the bottom portion.

In some examples, the leather burnishing tool may be configured to engage a tool holder. The tool holder includes a first end disposed opposite a second end and a body portion disposed between the first end and the second end. The first end of the tool holder includes an opening that is configured to engage the first channel of the leather burnishing tool to affix the tool holder to the leather burnishing tool. The second end of the tool holder includes a handle component configured to be held in a hand of a user. The tool holder is affixed to the leather burnishing tool via a mechanism, such as a snap button mechanism, a spring clip mechanism, a magnetic mechanism, or an adhesive mechanism, among other examples not explicitly listed herein.

The leather burnishing tool and/or the components of the leather burnishing tool may comprise a plastic material, a metal material, and/or a wood material, among other examples not explicitly listed herein. In examples, a width of the leather burnishing tool is approximately ¼ of an inch and a height of the leather burnishing tool is in a range of approximately ¼ of an inch to ½ of an inch. In additional examples, the leather burnishing tool is affixed to a fixed object, where the fixed object is flush with a horizontal surface or plane, such as a tabletop.

A second embodiment of the present invention describes a method to use the leather burnishing tool to shape an edge of the piece of leather. The method may include numerous process steps, such as: applying a material to the edge of the piece of leather. The material may be gum tragacanth, beeswax, water, and/or saddle soap, among other materials not explicitly listed herein. In some examples, this process step may not be used. The method may optionally include conditioning the piece of leather with an oil, such as jojoba oil. The method may then include: placing the edge of the piece of leather in the second channel of the leather burnishing tool, such that the bottom portion of the leather burnishing tool is flush with the horizontal surface. Next, the method includes: continuously sliding the leather burnishing tool along the edge of the piece of leather to shape the edge of the piece of leather. In examples where the leather burnishing tool comprises the tool holder, the method may include holding the handle component of the tool holder in a hand of a user while continuously sliding the leather burnishing tool along the edge of the piece of leather to shape the edge of the piece of leather.

In general, the present invention succeeds in conferring the following benefits and objectives.

It is an object of the present invention to provide a leather burnishing tool that can be slid along a flat plane or horizontal surface, while maintaining consistent pressure along the leather edge for shaping and smoothing to the profile of the leather burnishing tool.

DESCRIPTION OF THE PREFERRED EMBODIMENTS

Figure 1:
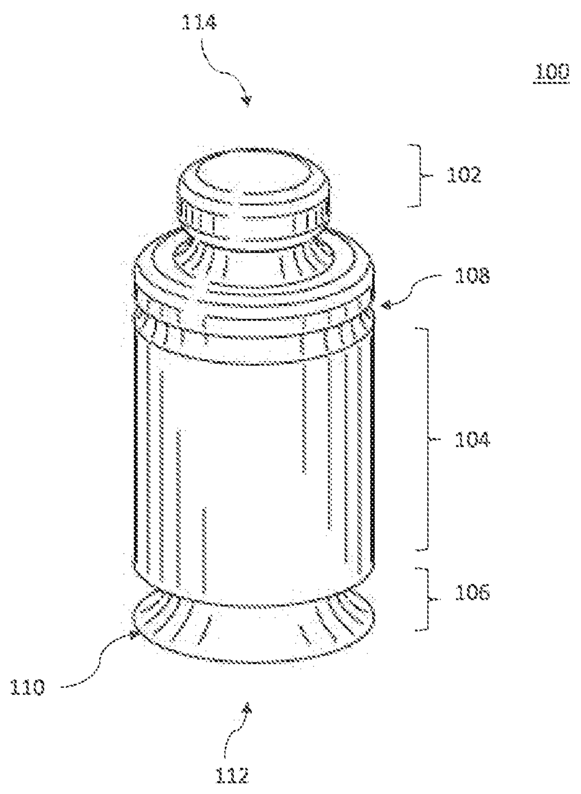
FIG. 1 depicts a schematic diagram of a leather burnishing tool, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

A leather burnishing tool 100 may be used to polish something, such as an edge of a piece of leather 116, by rubbing a portion of the leather burnishing tool 100 against the edge of the piece of leather 116, resulting in a smooth and shiny surface for the edge of the piece of leather 116. One such leather burnishing tool 100 is depicted and described herein.

Figure 2:
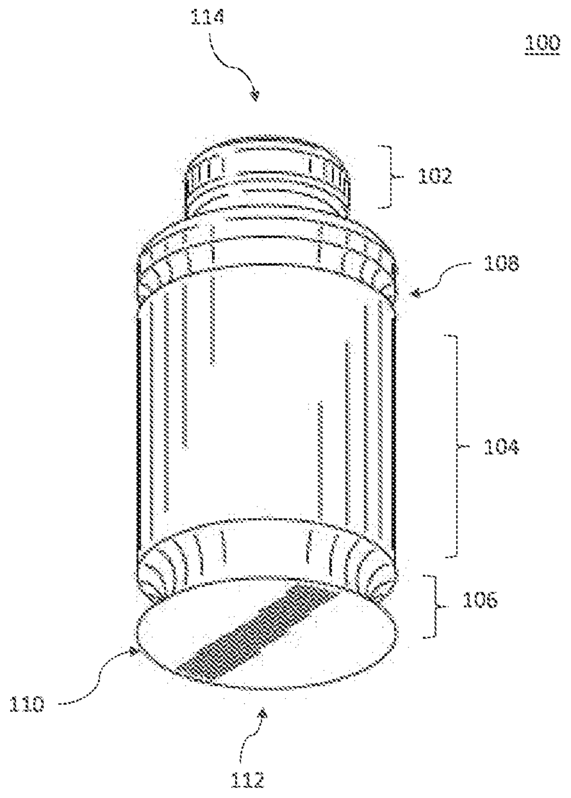
FIG. 2 depicts another schematic diagram of a leather burnishing tool, according to at least some embodiments disclosed herein.
Figure 3:
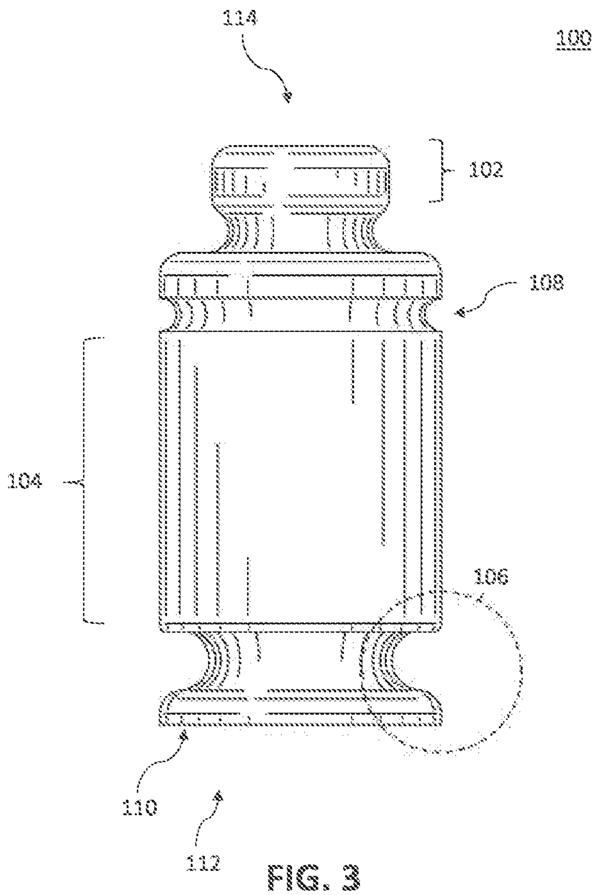
FIG. 3 depicts another schematic diagram of a leather burnishing tool, according to at least some embodiments disclosed herein.

The leather burnishing tool 100 (of FIG. 1, FIG. 2, and FIG. 3) may include a first end 114 disposed opposite a second end 112. A body portion 104 of the leather burnishing tool 100 is disposed between the first end 114 and the second end 112. The body portion 104 may be cylindrical (as depicted in FIG. 1, FIG. 2, and FIG. 3), substantially cylindrical, rectangular, or square in shape. It should be appreciated that the shape of the body portion 104 is not limited to those explicitly listed herein.

The first end 114 of the leather burnishing tool 100 includes a first channel 108 and a top portion 102. In some examples, the first channel 108 of the leather burnishing tool 100 is a spring clip channel. The top portion 102 of the leather burnishing tool 100 may include a snap button top portion, in examples. The second end 112 of the leather burnishing tool 100 includes a second channel 106 configured to accept an edge of a piece of leather 117 therein and a bottom portion 110 flush with a horizontal surface or plane, such as a tabletop.

The second channel 106 of the leather burnishing tool 100 is a polished channel. A size of the second channel 106 is in a range of approximately 1 mm to approximately 6 mm to accommodate thicker cow leather. In preferred examples, the size of the second channel 106 is in the range of approximately 1 mm to approximately 2 mm. In some examples, the size of the second channel 106 is approximately 1 mm. In other examples, the size of the second channel 106 is approximately 1.5 mm. In further examples, the size of the second channel 106 is approximately 2 mm. It should be appreciated that the size of the second channel 106 is not limited to the examples provided herein, as such examples are provided for illustrative purposes only.

Figure 4A:
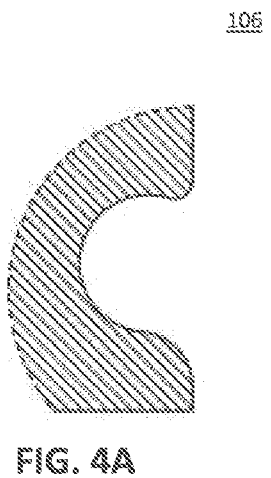
FIG. 4A depicts a schematic diagram of a channel of a leather burnishing tool, according to at least some embodiments disclosed herein.
Figure 4B:
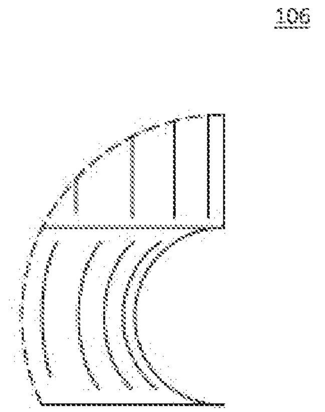
FIG. 4B depicts a schematic diagram of a first embodiment of a channel of a leather burnishing tool, according to at least some embodiments disclosed herein.
Figure 4C:
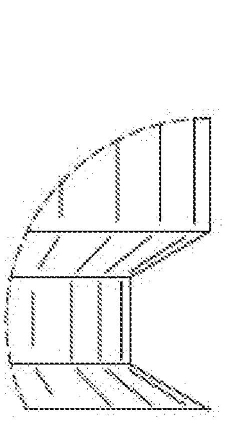
FIG. 4C depicts a schematic diagram of a second embodiment of a channel of a leather burnishing tool, according to at least some embodiments disclosed herein.

The second channel 106 is depicted in a circular broken line in FIG. 3. Various embodiments of the second channel 106 are depicted in FIG. 4A, FIG. 4B, and FIG. 4C. In some examples, the second channel 106 of the leather burnishing tool 100 comprises a round shape (as depicted in FIG. 4A and FIG. 4B). In other examples, the second channel 106 of the leather burnishing tool 100 comprises a hex shape (as depicted in FIG. 4C). In another examples, the second channel 106 is flush with the bottom portion 110 (as depicted in FIG. 4B). In alternative examples, the second channel 106 comprises a smooth tapered portion such that the second channel 106 is not flush with the bottom portion 110.

Figure 5:
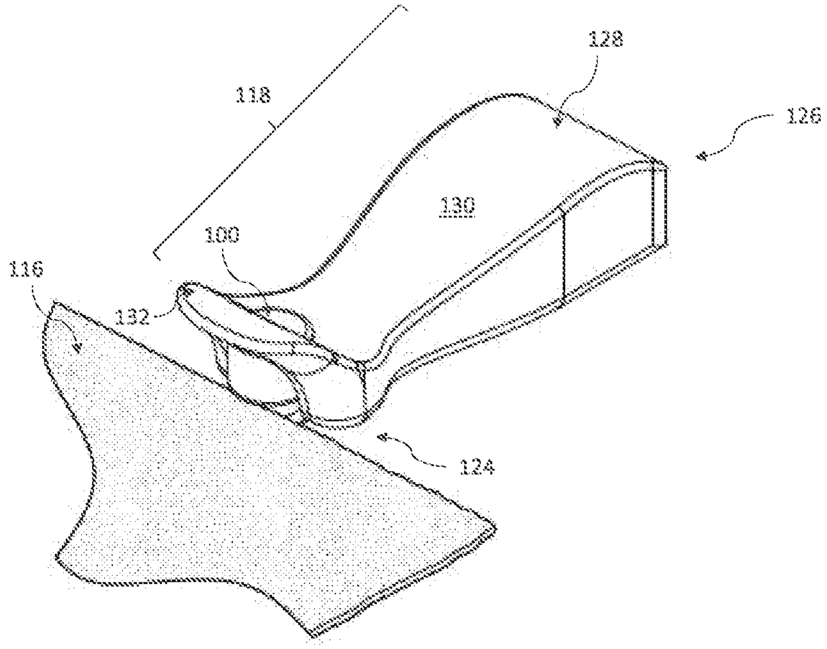
FIG. 5 depicts a schematic diagram of a first embodiment of a tool holder affixed to a leather burnishing tool, the leather burnishing tool being configured to accept, via a channel, an edge of a piece of leather, according to at least some embodiments disclosed herein.
Figure 6:
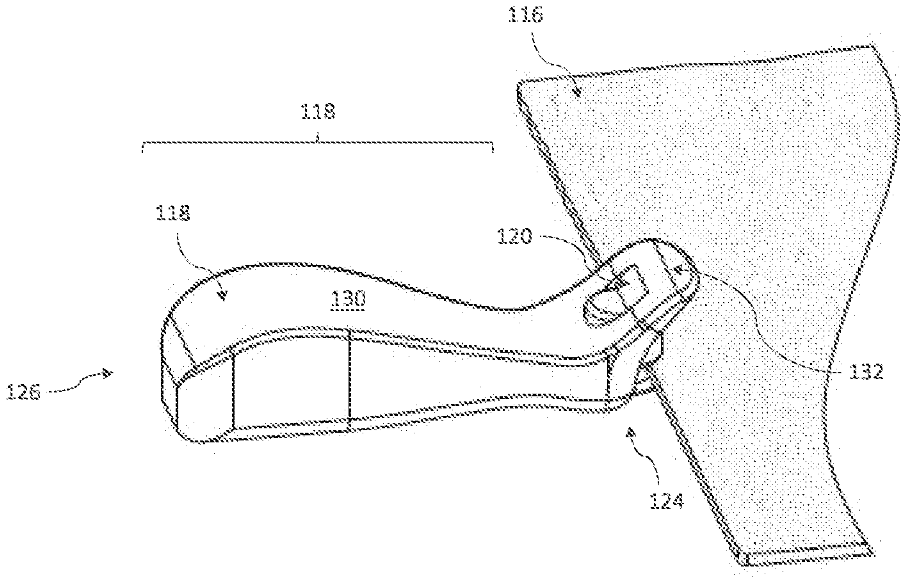
FIG. 6 depicts another schematic diagram of a first embodiment of a tool holder affixed to a leather burnishing tool, the leather burnishing tool being configured to accept, via a channel, an edge of a piece of leather, according to at least some embodiments disclosed herein.
Figure 8:
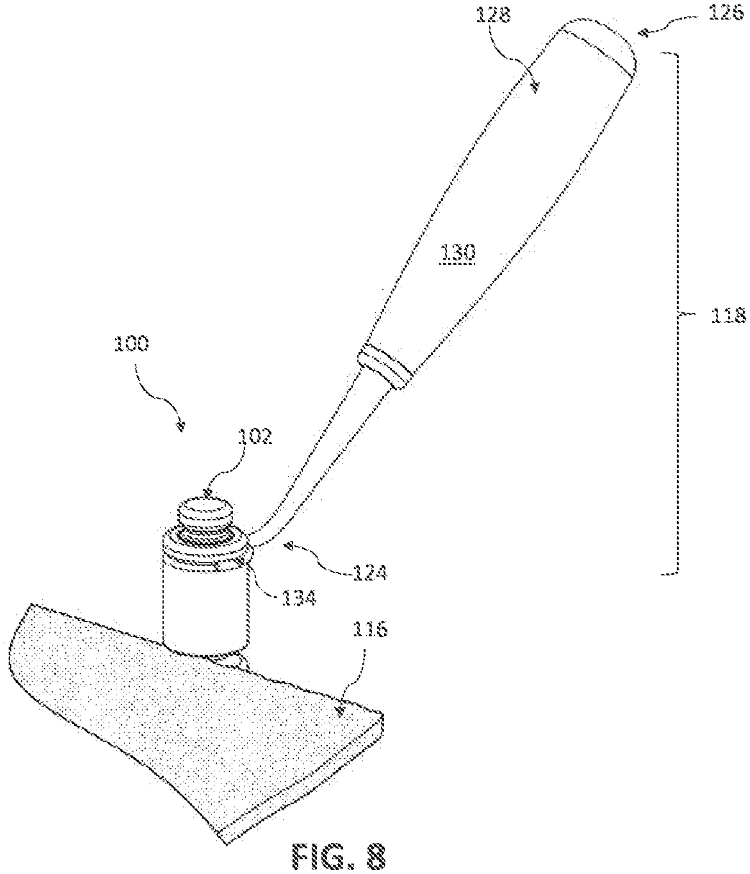
FIG. 8 depicts a schematic diagram of a second embodiment of a tool holder affixed to a leather burnishing tool, the leather burnishing tool being configured to accept, via a channel, an edge of a piece of leather, according to at least some embodiments disclosed herein.

In some examples, the leather burnishing tool 100 may be configured to engage a tool holder 118 (as depicted in FIG. 5, FIG. 6, and FIG. 8). The tool holder 118 is not limited to the examples described or depicted herein, as the examples are provided for illustrative purposes only. The tool holder 118 includes a first end 124 disposed opposite a second end 126. The tool holder 118 also includes a body portion 130 disposed between the first end 124 and the second end 126.

As depicted in FIG. 5 and FIG. 6, the body portion 130 may comprise a slope such that the second end 126 has a greater height than the first end 124. In some examples and as depicted in FIG. 5 and FIG. 6, the first end 124 may comprise a curved portion 132 that has a height greater than the height of the second end 126. The first end 124 of the tool holder 118 includes an opening 120 (as depicted in FIG. 6) that is configured to engage the first channel 108 of the leather burnishing tool 100 to affix the tool holder 118 to the leather burnishing tool 100.

In other examples and as depicted in FIG. 8, the body portion 130 may be substantially cylindrical or cylindrical in shape. As depicted in FIG. 8, the first end 124 of the tool holder 118 has a width smaller than the second end 126 of the tool holder 126. The first end 124 of the tool holder 118 of FIG. 8 includes a u-shaped component 134 receivable by the first channel 108 of the leather burnishing tool 100 to affix the tool holder 118 to the leather burnishing tool 100.

The second end 126 of the tool holder 118 includes a handle component 128 (as depicted in FIG. 5, FIG. 6, and FIG. 8). The handle component 128 is configured to be held in a hand of a user. The handle component 128 is not limited to any examples depicted herein, as such examples are provided for illustrative purposes only.

It should be appreciated that the tool holder 118 is affixed to the leather burnishing tool 100 via a mechanism, such as a snap button mechanism, a spring clip mechanism, or an adhesive mechanism, among other examples not explicitly listed herein. In some examples, the leather burnishing tool 100 or a portion of the leather burnishing tool 100 is magnetic such that the tool holder 118 is affixed to the leather burnishing tool 100 via a magnetic mechanism.

It should be appreciated that the leather burnishing tool 100 and/or the components of the leather burnishing tool 100 may comprise a plastic material, a metal material (such as brass), and/or a wood material, among other examples not explicitly listed herein. In examples, a width of the leather burnishing tool 100 is approximately ¼ of an inch and a height of the leather burnishing tool 100 is in a range of approximately ¼ of an inch to ½ of an inch. It should be appreciated that the width and height of the leather burnishing tool 100 is not limited to the examples provided herein.

Figure 7:
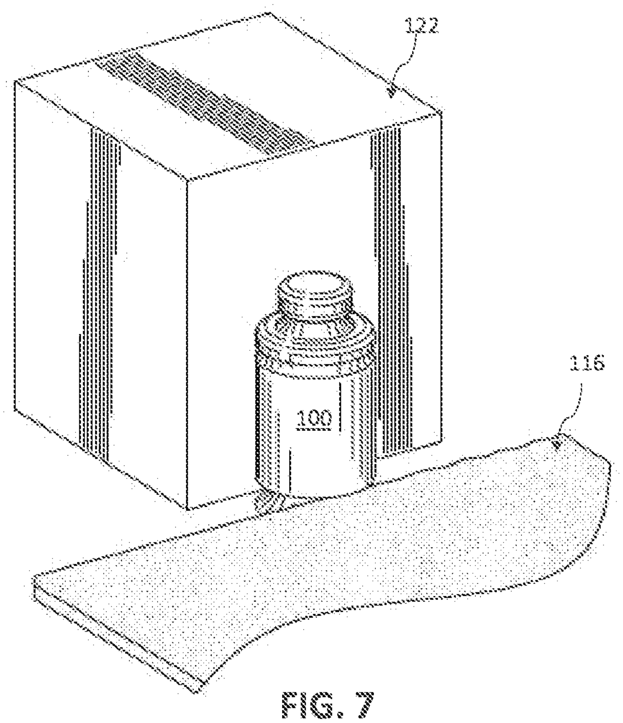
FIG. 7 depicts a schematic diagram of a leather burnishing tool being affixed to a fixed object, the fixed object being flush with a horizontal surface, where the leather burnishing tool is configured to accept, via a channel, an edge of a piece of leather, according to at least some embodiments disclosed herein.

In additional examples, the leather burnishing tool 100 is affixed to a fixed object 122 (as depicted in FIG. 7), where the fixed object 122 is flush with a flat plane or a horizontal surface, such as a tabletop. In examples, the fixed object 122 is a block of wood and the leather burnishing tool 100 is affixed to the fixed object 122 via an adhesive.

A method to use the leather burnishing tool 100 described herein to shape an edge of the piece of leather 116 may include numerous process steps, such as: applying a material to the edge of the piece of leather 116. The material may be gum tragacanth, beeswax, water, and/or saddle soap, among other materials not explicitly listed herein. The method may optionally include conditioning the edge of the piece of leather 116 with an oil, such as jojoba oil.

The method may then include: placing the edge of the piece of leather 116 in the second channel 106 of the leather burnishing tool 100, such that the bottom portion 110 at the second end 122 of the leather burnishing tool 100 is flush with the flat plane or the horizontal surface. The method then includes: continuously sliding the leather burnishing tool 100 along the edge of the piece of leather 116 to shape the edge of the piece of leather 116. Such continuous sliding creates friction to burnish the edge of the piece of leather 116. Further, sliding the leather burnishing tool 100 along the flat plane or the horizontal surface maintains consistent pressure along the edge of the piece of leather 116, smoothing the edge of the piece of leather 116 to the profile of the leather burnishing tool 100.

In examples where the leather burnishing tool 100 comprises the tool holder 118, the method may include holding the handle component 128 of the tool holder 118 in a hand of a user while continuously sliding the leather burnishing tool 100 along the edge of the piece of leather 116 to shape the edge of the piece of leather 116.

It should further be appreciated that in some examples, the leather burnishing tool 100 may be heated via an external source of heat (such as a heating pad or a heating gun, among other examples). In further examples, the leather burnishing tool 100 may be heated with a mini-heating element that is affixed to a holder or is present inside of the leather burnishing tool 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A leather burnisher comprising:
a top forming a snap button attachment,
wherein the snap button attachment has an upper snap having a width and a neck located below the upper snap, wherein a width of the neck is less than the width of the upper snap;
a first channel located below the top,
wherein the first channel is a non-leather burnishing channel, and
wherein a width of the first channel is less than a width of a portion of the leather burnisher located between the top and the first channel;
a body directly affixed to a bottom surface of the first channel,
wherein the width of the first channel is less than a width of the body;
a second channel configured to accept an edge of a piece of leather therein,
wherein the second channel is shaped to form a hex shape or a round shape; and
a bottom configured to be flush with a horizontal surface,
wherein the second channel is formed between a lower surface of the body and an upper surface of the bottom a handle having a first end disposed opposite a second end, the first end comprising an opening or a component configured to engage the first channel to affix the handle to the leather burnisher and the second end configured to be held in a hand of a user; and a body portion disposed between the first end and the second end.

2. The leather burnisher of claim 1, wherein the second channel is a polished channel.

3. The leather burnisher of claim 1, wherein the second channel is flush with the bottom.

4. The leather burnisher of claim 1, wherein the second channel comprises a smooth tapered portion such that the second channel is not flush with the bottom.

5. The leather burnisher of claim 1, wherein the second channel comprises a size in a range of approximately 1 mm to approximately 6 mm.

6. The leather burnisher of claim 1, wherein the handle is affixed to the leather burnisher via a mechanism selected from the group consisting of: a snap button mechanism, a spring clip mechanism, a magnetic mechanism, and an adhesive mechanism.

7. The leather burnisher of claim 1, wherein a shape of the body is selected from the group consisting of: a cylindrical shape, a substantially cylindrical shape, a rectangular shape, and a square shape.

8. The leather burnisher of claim 1, wherein a material comprising the leather burnisher is selected from the group consisting of: a plastic material, a metal material, and a wood material.

9. The leather burnisher of claim 1, wherein the leather burnisher is affixed to a fixed object, the fixed object being flush with a horizontal surface.

10. A method using a leather burnisher to shape an edge of a piece of leather, the method comprising:

apply a material to the edge of the piece of leather;

placing the edge of the piece of leather in a channel proximate a bottom of the leather burnisher of claim 1, such that the bottom of the leather burnisher is flush with a horizontal surface; and continuously sliding the leather burnisher along the edge of the piece of leather to shape the edge of the piece of leather.

11. The method of claim 10, wherein the channel is a polished channel, and wherein the polished channel comprises a round shape or a hex shape.

12. The method of claim 10, wherein the channel is flush with the bottom of the leather burnisher.

13. The method of claim 10, wherein the channel comprises a smooth tapered portion such that the channel is not flush with the bottom of the leather burnisher.

14. The method of claim 10, wherein the material is selected from the group consisting of: gum tragacanth, beeswax, water, and saddle soap.

15. The method of claim 10, wherein:

the leather burnisher is configured to engage a handle, the handle comprises a first end disposed opposite a second end and a body portion disposed between the first end and the second end, the first end comprises an opening configured to engage another channel proximate another end to affix the handle to the leather burnisher, the end is disposed opposite the other end.

16. The method of claim 15, further comprising:

holding the handle in a hand of a user while continuously sliding the leather burnisher along the edge of the piece of leather to shape the edge of the piece of leather.

17. A leather burnisher comprising:

a burnisher comprising:

a top forming a snap button attachment, wherein the snap button attachment has an upper snap having a width and a neck located below the upper snap, wherein a width of the neck is less than the width of the upper snap;

a first channel located below the top, wherein the first channel is a non-leather burnishing channel, and wherein a width of the first channel is less than a width of a portion of the leather burnisher located between the top and the first channel;

a body directly affixed to a bottom surface of the first channel, wherein the width of the first channel is less than a width of the body;

a second channel configured to accept an edge of a piece of leather therein, wherein the second channel is shaped to form a hex shape or round shape; and a bottom configured to be flush with a horizontal surface, wherein the second channel is formed between a lower surface of the body and an upper surface of the bottom; and a handle having a first end and a second end, wherein the first end of the handle has an aperture configured to directly attach to either of the snap button attachment and/or the first channel of the burnisher.

* * * * *